No. 891,037. PATENTED JUNE 16, 1908.
C. D. CALDWELL.
ARTIFICIAL BAIT.
APPLICATION FILED JUNE 14, 1907.
2 SHEETS—SHEET 1.
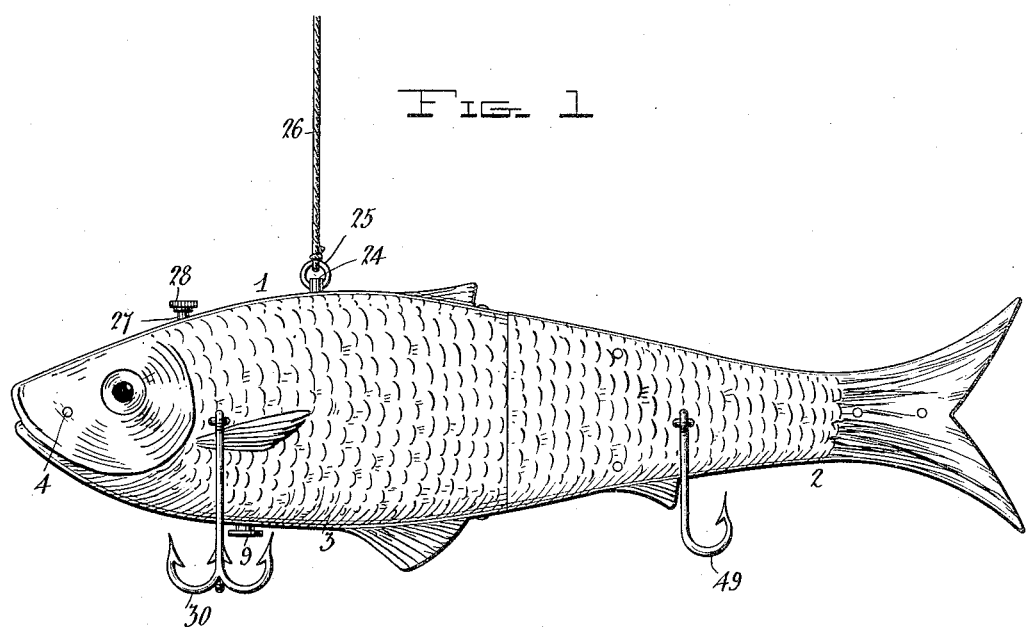
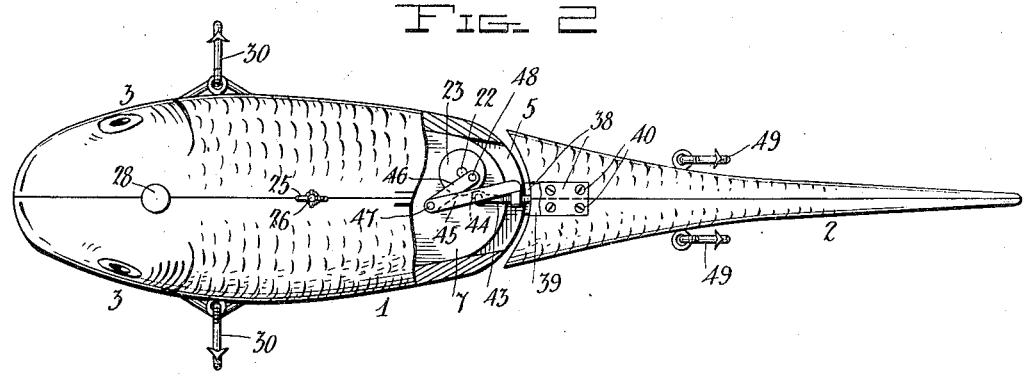
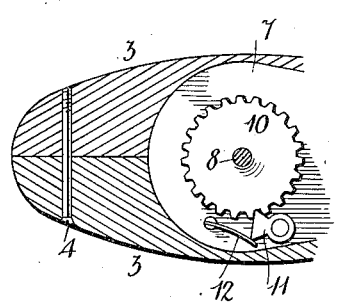
Inventor
Charley D. Caldwell
Witnesses
By Victor J. Evans
Attorney

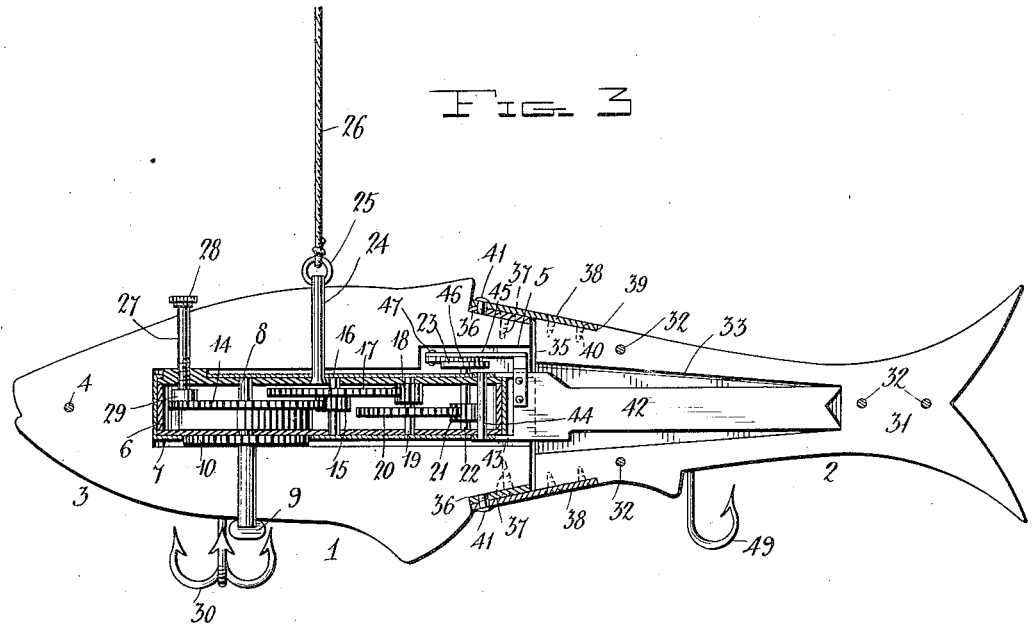
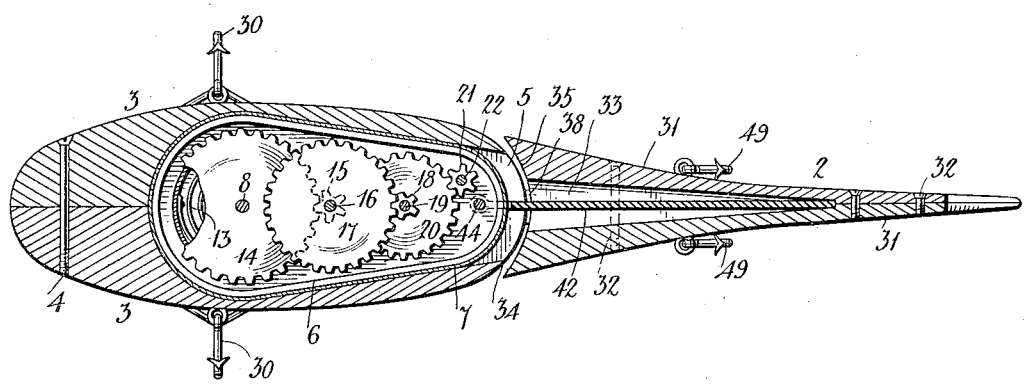

UNITED STATES PATENT OFFICE.

CHARLEY D. CALDWELL, OF PARIS, TEXAS.

ARTIFICIAL BAIT.

No. 891,037.  Specification of Letters Patent.  Patented June 16, 1908.

Application filed June 14, 1907. Serial No. 379,018.

*To all whom it may concern:*

Be it known that I, CHARLEY D. CALDWELL, a citizen of the United States, residing at Paris, in the county of Lamar and State of Texas, have invented new and useful Improvements in Artificial Bait, of which the following is a specification.

This invention is an improved artificial bait to simulate the motions of live bait, and comprises a figure for attachment to a line, having an angularly movable portion and a motor to operate such angularly movable portion, as hereinafter described and claimed.

In the accompanying drawings,—Figure 1 is an elevation of a bait embodying my invention. Fig. 2 is a top plan view of the same with a portion of the body shown in section. Fig. 3 is a vertical longitudinal central sectional view of the same. Fig. 4 is a horizontal longitudinal central sectional view of the same. Fig. 5 is a detail inverted view partly in section, disclosing the pawl and ratchet mechanism which admits of the winding of the spring of the actuating motor.

Within the scope of my invention the figure, which is here shown as a minnow, may resemble any other kind of fish or other live bait, and I do not desire to limit myself in this particular. Such figure comprises a body portion 1 and an angularly movable portion, here shown as the tail 2. The body comprises a pair of members 3 which are separable from each other and are connected together by a screw or other suitable device 4 which extends transversely therethrough. The said body portion is formed with a chamber 5 which is made partly in each of the members 3 and the rear end of which is open. A spring motor 6 is placed in said chamber and is provided with a waterproof casing 7 which prevents the parts of such motor from getting wet when the bait is submerged and in use for fishing. Such motor is shown as provided with a winding shaft 8 which is vertically disposed, extends downwardly through an opening in the lower portion of the body and is provided with a head or button 9 to enable such spring to be turned. A pinion 10 is secured to the said shaft at the lower side of the motor casing and is engaged by a spring-pressed pawl 11, the spring which presses such pawl into engagement with such pinion being shown at 12 in Fig. 5. The spring 13, which may be wound by turning the shaft 8 serves to drive a master gear 14 which engages a pinion 15 on the shaft 16 that also carries a speed-reducing gear 17. Such gear engages a pinion 18 on a shaft 19 which also carries a speed-reducing gear 20 that engages a pinion 21 on the shaft 22. A crank disk 23 is secured on the upper end of the said shaft which extends above the upper side of the motor casing. A pin 24 is shown attached to the upper side of the motor casing, extended through the upper portion of the body of the bait figure and provided at its upper end with a ring or eye 25 to which a line 26 may be attached, which line serves to suspend the bait figure in the water to support the same at any suitable depth below the surface of the water.

A speed-regulating device is employed for the spring motor, which device is here shown as a screw 27, which operates in a threaded opening in the upper side of the motor casing, but extends upwardly through a vertical opening in the body of the bait figure, is provided at its upper end with a button or like device 28, whereby it may be readily turned, and is provided at its lower end with a friction shoe 29 which may be cylindrical in form or of any other suitable shape and may, by properly turning such screw 27, be caused to bear frictionally to any desired extent on the master gear 14 to retard the revolution of such master gear and hence regulate the speed of the motor. By turning such screw 27 far enough such master gear may be entirely prevented from rotating and hence prevent the spring from running down.

The body portion of the bait figure is here shown as provided on opposite sides with hooks 30 which depend therefrom near the head thereof.

The angularly movable tail portion 2 of the bait figure is here shown as comprising a pair of longitudinal members 31 secured together by screws or the like devices 32. The said tail portion of the bait figure has a longitudinal opening or chamber 33 therein which is open at the front end thereof and widens toward such front end. The rear portion of the body is semi-cylindrical in form, as at 34. The front portion of the tail is provided with a substantially semi-circular recess 35 close to such semi-cylindrical rear end portion 32 of the body so that the side edges at the front corners of the tail portion overlap the rounded rear end of the body to hide the joint between the body and the tail of the figure.

In Fig. 3 the body portion of the figure is shown as provided at its rear end, at its upper and lower edges, with metallic plates 36 secured thereto, as by springs 37. The tail is provided at its front portion on its upper and lower sides with metallic arms 38 which are recessed therein, as at 39, and have their rear portions secured thereto, as by screws 40. The front portions of said arms pass over the joint between the body and tail, overlap the plates 36 and are pivotally connected to such plates, as at 41, thereby effecting a pivotal connection between the tail and body to enable the tail to move angularly with reference to the body to simulate the motions of the tail of a fish when in the act of swimming.

A rocking arm 42 has its front portion bifurcated to form fork arms 43 which receive the rear portion of the motor casing and are attached to the upper and lower ends of a spindle 44, whereby such rocking arm is pivotally connected to the exterior of the motor casing. Such rocking arm extends into the chamber or recess 33 in the tail of the bait figure and is provided at its front end with an arm 45 that projects forwardly therefrom beyond the pivotal axis of such rocking arm 42. A link 46 is pivotally connected to such arm 45, as at 47, and is connected also to a wrist member 48 which projects from the crank disk 23.

It will be understood from the foregoing that when the spring motor is in operation the rocking arm 42 will be operated and will serve to move the tail of the bait member back and forth to simulate the motions of the tail of a fish and thereby make the bait as attractive as a live bait. The tail of the body member is shown as provided on opposite sides with hooks 49 which depend therefrom.

Having thus described the invention, what is claimed as new, is:—

1. A bait of the class described comprising a body portion having its rear end substantially semi-cylindrical in form, and a tail portion pivotally connected to the body portion and provided at its front end with a substantially semi-cylindrical recess receiving the rounded rear end of the body portion and providing side walls overlapping the rounded rear end of the body portion and tending to hide the joint between the body portion and the tail portion.

2. A bait of the class described having an angularly movable member, a spring motor to actuate such angularly movable member and provided with a gear, and means to frictionally engage such gear to stop or regulate the speed of such motor.

In testimony whereof, I affix my signature in presence of two witnesses.

CHARLEY D. CALDWELL.

Witnesses:
F. D. MALLORY,
W. W. FITZPATRICK.